(12) United States Patent
Beneditz et al.

(10) Patent No.: US 6,856,045 B1
(45) Date of Patent: Feb. 15, 2005

(54) POWER DISTRIBUTION ASSEMBLY WITH REDUNDANT ARCHITECTURE

(75) Inventors: Bruce D. Beneditz, Roscoe, IL (US); Russell G. Stoneback, Rockford, IL (US); Marc A. Bouton, Loves Park, IL (US); Kenneth Spear, Munich (DE); John A. Dickey, Scottsdale, AZ (US)

(73) Assignee: Hamilton Sundstrand Corporation, Rockford, IL (US)

( * ) Notice: Subject to any disclaimer, the term of this patent is extended or adjusted under 35 U.S.C. 154(b) by 394 days.

(21) Appl. No.: 10/060,043

(22) Filed: Jan. 29, 2002

(51) Int. Cl.⁷ .................................................. H02J 3/14
(52) U.S. Cl. ...................... 307/43; 307/9.1; 307/10.1; 307/18; 307/29; 700/4; 700/20; 700/82
(58) Field of Search .......................... 307/43, 9.1, 10.1, 307/18, 29; 700/4, 20, 82

(56) References Cited

U.S. PATENT DOCUMENTS

| | | |
|---|---|---|
| 3,488,563 A | 1/1970 | Caruthers |
| 3,842,249 A | 10/1974 | Geyer |
| 3,982,158 A | 9/1976 | Knauer |
| 4,161,027 A | 7/1979 | Russell |
| 4,174,496 A | 11/1979 | McFall |
| 4,264,827 A | 4/1981 | Herzog |
| 4,288,838 A | 9/1981 | Van Der Vegte |
| 4,321,645 A | 3/1982 | Thom |
| 4,333,702 A | 6/1982 | Herrmann |
| 4,357,665 A | 11/1982 | Korff |
| 4,400,626 A | 8/1983 | Lacy |
| 4,403,292 A | 9/1983 | Ejzak |
| 4,404,473 A | 9/1983 | Fox |
| 4,419,588 A | 12/1983 | Goiset |
| 4,425,564 A * | 1/1984 | Steele .................. 370/298 |
| 4,493,018 A | 1/1985 | Hopmayer |
| 4,607,330 A * | 8/1986 | McMurray et al. .......... 714/14 |
| 4,654,846 A * | 3/1987 | Goodwin et al. ............. 714/13 |
| 4,672,511 A | 6/1987 | Meusel |
| 4,672,529 A * | 6/1987 | Kupersmit .................... 700/1 |

(List continued on next page.)

OTHER PUBLICATIONS

Cypress Semiconductor Corporation, "Serializing High Speed Parallel Buses to Extend Their Operational Length", Jul. 1995.*

U.S. Appl. No. 09/911,751, entitled "Serviceable Power Modules for a Power Distribution Assembly", filed Jul. 23, 2001.

Primary Examiner—Robert L. DeBeradinis
(74) Attorney, Agent, or Firm—Carlson, Gaskey & Olds

(57) ABSTRACT

A power distribution assembly (PDA) includes a plurality of power modules that are installed within a chassis that is mounted to a vehicle, such as an aircraft. The power modules are used to control aircraft systems such as braking, navigation, or temperature control systems. The PDA includes first and second microprocessors that have separate serial busses that are in communication with each of the power modules. A first power supply powers the first microprocessor and each of the power modules and a second power supply powers the second microprocessor and each of the power modules independently from the first power supply. Additionally the first and second microprocessors communicate with each other via both serial busses to determine which microprocessor is in active control and which microprocessor is on standby in addition to monitoring the health of the other microprocessor. The microprocessors can be used to provide command signals to satellite power distribution assemblies having satellite power modules for controlling additional aircraft systems. This configuration allows smaller satellite power distribution assemblies to be incorporated into the aircraft, which facilitates installation and provides more flexibility.

19 Claims, 6 Drawing Sheets

U.S. PATENT DOCUMENTS

| | | | | |
|---|---|---|---|---|
| 4,817,091 A | * | 3/1989 | Katzman et al. | 714/8 |
| 4,926,281 A | * | 5/1990 | Murphy | 361/55 |
| 4,942,499 A | | 7/1990 | Shibata | |
| 5,027,002 A | | 6/1991 | Thornton | |
| 5,119,268 A | | 6/1992 | Brown | |
| 5,126,585 A | | 6/1992 | Boys | |
| 5,155,729 A | * | 10/1992 | Rysko et al. | 714/11 |
| 5,168,842 A | | 12/1992 | Brooks | |
| 5,289,377 A | * | 2/1994 | Yokote et al. | 701/35 |
| 5,303,986 A | * | 4/1994 | VanDeMotter et al. | 303/3 |
| 5,324,989 A | | 6/1994 | Thornton | |
| 5,325,363 A | * | 6/1994 | Lui | 714/6 |
| 5,386,147 A | | 1/1995 | Bonneau | |
| 5,390,356 A | * | 2/1995 | Houlberg | 703/23 |
| 5,422,517 A | | 6/1995 | Verney | |
| 5,436,827 A | * | 7/1995 | Gunn et al. | 700/82 |
| 5,444,608 A | | 8/1995 | Jain | |
| 5,465,011 A | | 11/1995 | Miller | |
| 5,466,974 A | | 11/1995 | Sutrina | |
| 5,508,689 A | | 4/1996 | Rado | |
| 5,570,002 A | | 10/1996 | Castleman | |
| 5,583,419 A | | 12/1996 | Haller | |
| 5,594,285 A | | 1/1997 | Wisbey | |
| 5,604,421 A | | 2/1997 | Barnsley | |
| 5,606,245 A | | 2/1997 | Kirby | |
| 5,612,579 A | * | 3/1997 | Wisbey et al. | 307/18 |
| 5,615,105 A | | 3/1997 | Tofigh | |
| 5,652,893 A | * | 7/1997 | Ben-Meir et al. | 713/310 |
| 5,669,470 A | | 9/1997 | Ross | |
| 5,672,958 A | * | 9/1997 | Brown et al. | 323/269 |
| 5,679,985 A | * | 10/1997 | Brailey et al. | 307/18 |
| 5,708,771 A | * | 1/1998 | Brant et al. | 714/22 |
| 5,745,670 A | * | 4/1998 | Linde | 714/22 |
| 5,752,047 A | | 5/1998 | Darty | |
| 5,761,084 A | * | 6/1998 | Edwards | 700/293 |
| 5,764,502 A | | 6/1998 | Morgan | |
| 5,775,956 A | | 7/1998 | Sticker | |
| 5,777,874 A | * | 7/1998 | Flood et al. | 700/82 |
| 5,844,329 A | | 12/1998 | Bailey | |
| 5,847,950 A | | 12/1998 | Bhagwat | |
| 5,887,270 A | * | 3/1999 | Brant et al. | 711/162 |
| 5,936,318 A | | 8/1999 | Weiler | |
| 5,937,065 A | * | 8/1999 | Simon et al. | 380/262 |
| 5,939,800 A | | 8/1999 | Artinian | |
| 5,939,802 A | | 8/1999 | Hornbeck | |
| 5,942,811 A | | 8/1999 | Stumfall | |
| 5,945,746 A | | 8/1999 | Tracewell | |
| 5,953,314 A | * | 9/1999 | Ganmukhi et al. | 370/220 |
| 5,977,645 A | | 11/1999 | Glennon | |
| 5,982,652 A | * | 11/1999 | Simonelli et al. | 363/142 |
| 6,011,322 A | | 1/2000 | Stumfall | |
| 6,052,753 A | | 4/2000 | Doerenberg | |
| 6,054,846 A | | 4/2000 | Castleman | |
| 6,094,416 A | * | 7/2000 | Ying | 370/222 |
| 6,133,846 A | * | 10/2000 | Birkedahl et al. | 370/225 |
| 6,142,418 A | | 11/2000 | Weber | |
| 6,177,867 B1 | * | 1/2001 | Simon et al. | 340/468 |
| 6,198,642 B1 | | 3/2001 | Kociecki | |
| 6,201,319 B1 | * | 3/2001 | Simonelli et al. | 307/26 |
| 6,239,508 B1 | | 5/2001 | Faris | |
| 6,296,325 B1 | * | 10/2001 | Corio et al. | 303/20 |
| 6,344,700 B1 | * | 2/2002 | Eisenhauer et al. | 307/64 |
| 6,368,064 B1 | * | 4/2002 | Bendikas et al. | 417/2 |
| 6,393,343 B1 | * | 5/2002 | Frey et al. | 701/3 |
| 6,402,259 B2 | * | 6/2002 | Corio et al. | 303/20 |
| 6,404,326 B1 | * | 6/2002 | Timmerman et al. | 340/286.01 |
| 6,411,857 B1 | | 6/2002 | Flood | 700/4 |
| 6,449,732 B1 | * | 9/2002 | Rasmussen et al. | 714/12 |
| 6,467,065 B1 | * | 10/2002 | Mendez et al. | 714/800 |
| 6,490,277 B1 | * | 12/2002 | Tzotzkov | 370/360 |
| 6,498,966 B1 | * | 12/2002 | Åkerlund | 700/296 |
| 6,504,730 B1 | | 1/2003 | Cooney et al. | 361/826 |
| 6,513,055 B1 | | 1/2003 | Boran | 708/551 |
| 6,525,432 B2 | * | 2/2003 | Heckmann et al. | 307/10.1 |
| 6,529,124 B2 | * | 3/2003 | Flick | 340/426.1 |
| 6,607,251 B2 | * | 8/2003 | Baumgartner et al. | 303/20 |
| 6,661,119 B2 | * | 12/2003 | Liu et al. | 307/71 |
| 6,664,656 B2 | * | 12/2003 | Bernier | 307/9.1 |
| 6,694,382 B1 | * | 2/2004 | Kovalan et al. | 710/5 |
| 2003/0135768 A1 | * | 7/2003 | Knee et al. | 713/300 |

* cited by examiner

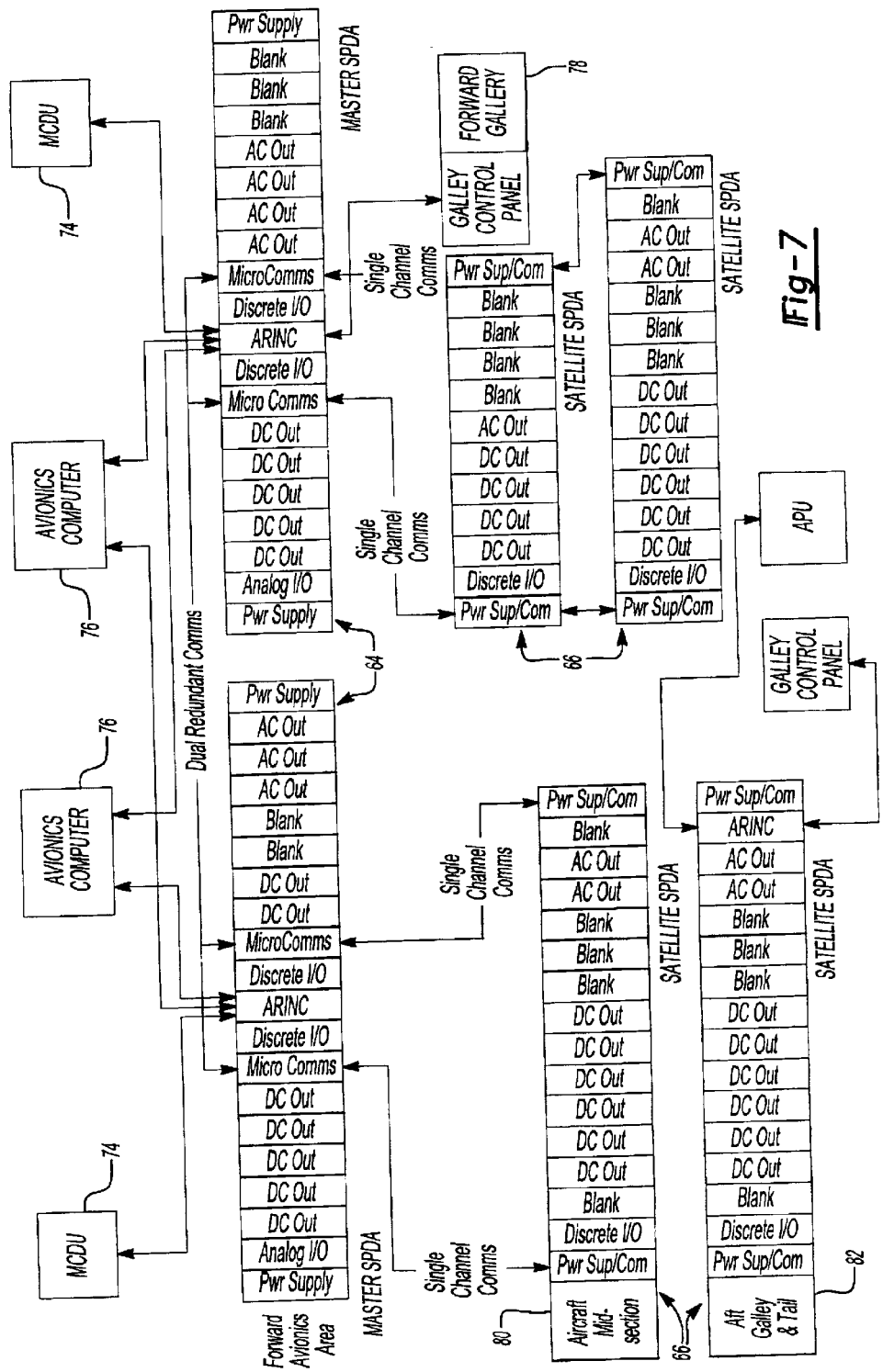

POWER DISTRIBUTION ASSEMBLY WITH REDUNDANT ARCHITECTURE

BACKGROUND OF THE INVENTION

This invention relates to a power distribution assembly that incorporates an electrical architecture with improved redundancy to eliminate single point failures above an individual input/output module level by utilizing multiple power supplies and microprocessors independently connected to each input/output module.

Typically vehicles, such as an aircraft, utilize a power distribution assembly (PDA) to distribute power from a primary power source to various aircraft systems. A PDA includes a chassis mounted within the vehicle that houses multiple power modules, which are used to power the aircraft systems. Control modules are also housed within the PDA, for functions such as communications, microprocessing, etc. The power modules interact with the control modules to provide proper communication and control of power for each of the aircraft systems.

Traditionally, a PDA includes an active control microprocessor with a first power supply and a standby or back-up control microprocessor with a second power supply. A single arbitration card provides a communication interface for both the active and back-up control microprocessors. A common data bus is connected to each of the power modules and interfaces with the arbitration card. Thus, all command and status data between the microprocessors and each individual module is transmitted via the single arbitration card. This traditional architecture configuration is slow, inefficient, and has difficulties supporting high-speed aircraft data busses. It is also difficult with this configuration to expand the system to include satellite power distribution assemblies.

Another disadvantage with this electrical architectural configuration is that a single point failure in the arbitration card or in the common data bus can result in loss of control of more than one power module. Further, the current autonomous configuration for each of the microprocessors prevents the microprocessors from having the ability to monitor the health of the other microprocessor and report problems.

It is desirable to provide an improved PDA with redundant electrical architecture to eliminate single point failures above an individual input/output module level. It is also desirable to provide a flexible PDA that can be used on different aircraft types. The PDA should have improved performance and efficiency in addition to overcoming the above referenced deficiencies with prior art systems.

SUMMARY OF THE INVENTION

The subject invention provides a modular design for a power distribution assembly (PDA) with redundant electrical architecture to reduce the effect of single point failures. The PDA includes a plurality of power modules that are used to control vehicle systems. The subject PDA is configured such that single point failures will only affect the respective power module and will not result in loss of control of additional modules.

In the preferred embodiment, the PDA includes first and second microprocessors with separate serial busses that are in independent communication with each of the power modules. A first power supply powers the first microprocessor and each of the power modules and a second power supply powers the second microprocessor and each of the power modules. Thus, power modules are capable of being supplied with power from the first or second power supply. This configuration with independent communication capability to each power module from different microprocessors and with independent power capability to each module from different power supplies provides the redundant architecture that improves reliability and system performance.

Additionally the first and second microprocessors communicate with each other via both serial busses to determine which microprocessor is in active control and which microprocessor is on standby in addition to monitoring the health of the other microprocessor. Thus, one microprocessor can diagnose problems in the other microprocessor and take the appropriate action to ensure that the PDA operates according to specifications.

The dual power supplies and microprocessors can be used to provide power and command signals to satellite power distribution assemblies having additional power modules for controlling additional aircraft systems. The PDA with the dual microprocessors, dual power supplies, and the plurality of power modules is often referred to as a master power distribution assembly. One master power distribution assembly can command multiple satellite power distribution assemblies. Each power module in a satellite chassis is connected to two different satellite serial busses that communicate with the serial busses for the first and second serial busses, respectively, in the master power distribution assembly. This configuration allows smaller satellite power distribution assemblies to be incorporated into the aircraft, which facilitates installation and provides more flexibility.

The subject invention provides an improved PDA that reduces the effects of single point failures, and which is more efficient and reliable. These and other features of the present invention can be best understood from the following specification and drawings, the following of which is a brief description.

BRIEF DESCRIPTION OF THE DRAWING

FIG. 7 is an example of a vehicle application incorporating the subject invention.

DETAILED DESCRIPTION OF AN EXAMPLARY EMBODIMENT

Figure 1:
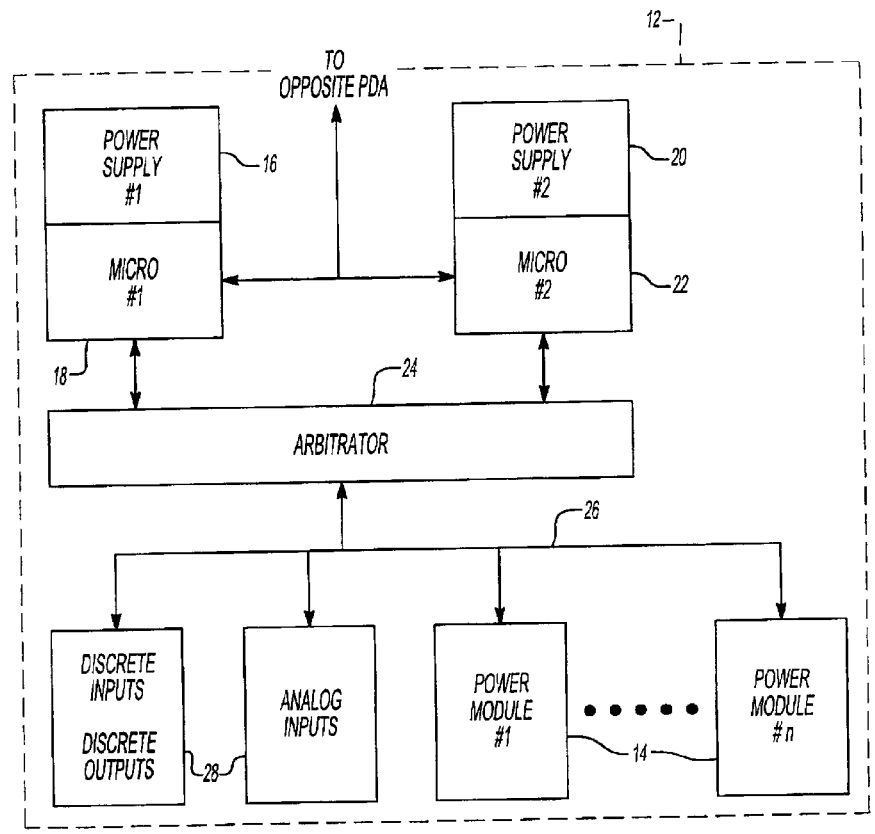
FIG. 1 is a block diagram of a prior art command and power architecture configuration for a power distribution assembly.

A traditional architectural configuration for a vehicle power distribution system is shown in FIG. 1. This system is used in a vehicle, such as an aircraft, and includes a power distribution assembly (PDA) 12 that distributes power and commands to a plurality of power modules 14. The power modules 14 control aircraft systems, such as fuel, hydraulic, navigation, and brake systems, for example. The subject invention is preferably incorporated into a secondary power distribution assembly (SPDA) system, however, the invention could also be used in other power distribution systems. Additionally, there are often multiple PDAs installed within the aircraft to more efficiently distribute power to all locations within the aircraft. This will be discussed in greater detail below.

The traditional PDA 12 includes a first power supply 16 that powers a first microprocessor 18 and a second power supply 20 that powers a second microprocessor 22. Both microprocessors 18, 22 are interfaced with a single arbitration card 24. A common data bus 26 is connected to each of the power modules 14 and interfaces with the arbitration card 24. Additional discrete input/outputs 28 are also controlled via the common data bus 26. Thus, all command and status data between the microprocessors 18, 22 and each individual power module 14 is transmitted via the single arbitration card 24. From a failure standpoint, this configuration is disadvantageous because a single point failure at the data bus 26 or at the supervisor card 24 levels can result in loss of control of multiple power modules 14.

Another disadvantage with this traditional electrical architecture is that it does not provide sufficient flexibility and processing throughput to meet the increased demands of today's aircraft systems. Additionally, the traditional electrical architecture requires significant redesign when one PDA for a first application is incorporated into a second application that requires additional communication and power distribution options. The subject invention addresses this problem by providing a modular design for a PDA with families of modules that are installed within a chassis. The modular PDA can be implemented in multiple different applications without requiring significant redesign of hardware, electrical architecture, and/or packaging. The mechanical packaging aspect of the PDA is described in U.S. application Ser. No. 09/911,751, filed on Jul. 23, 2001 entitled "Serviceable Power Modules For A Power Distribution Assembly." The teachings of that application are incorporated into this specification by reference.

Figure 2:
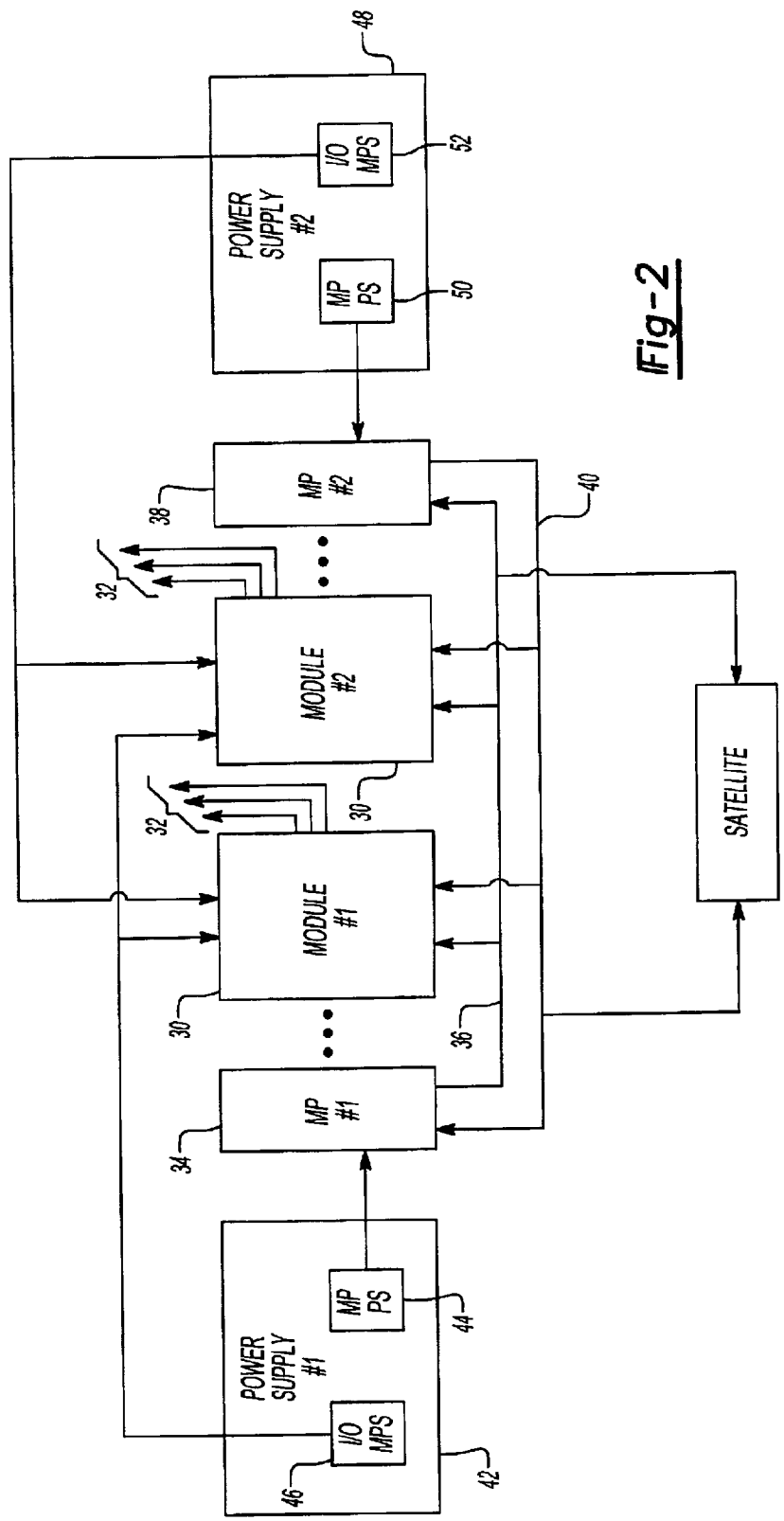
FIG. 2 is a block diagram of the command and power architecture configuration incorporating the subject invention.

The subject invention is directed toward an electrical architecture that is easily incorporated within the modular PDA to increase operating efficiency and reliability. A schematic diagram of this unique electrical architecture is shown in FIG. 2. The modular PDA includes a plurality of power modules 30 that provide outputs 32 to various aircraft systems as described above. A first microprocessor 34 is connected to each of the power modules 30 with a first serial bus 36. A second microprocessor 38 is connected to each of the power modules 30 with a separate second bus 40.

A first power supply 42 includes a microprocessor power supply portion 44 that powers the first microprocessor 34 and a power module supply portion 46 that powers each of the power modules 30. A second power supply 48 includes a microprocessor power supply portion 50 that powers the second microprocessor 38 and a power module supply portion 52 that powers each of the power modules 30 independently from the first power supply 42.

The first microprocessor 34 is also in communication with the second microprocessor 38 via the first serial bus 36 to monitor the health and diagnose problems with the second microprocessor 38. The second microprocessor 38 is in communication with the first microprocessor 34 via the second serial bus 40 to monitor the health and diagnose problems with the first microprocessor 34. The microprocessors 34, 38 communicate with each other to independently determine which microprocessor 34 or 38 is in active operating control and which microprocessor 34 or 38 is on standby or back-up control.

Figure 3:
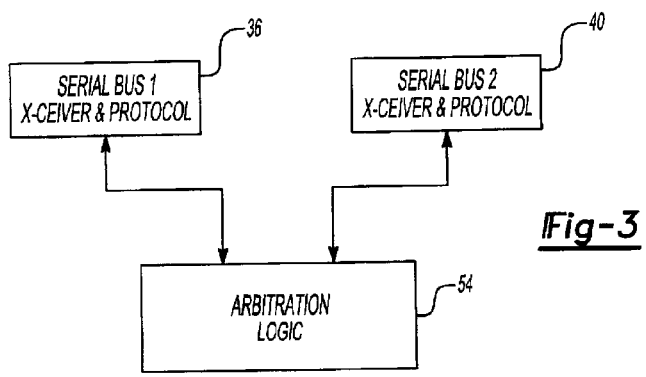
FIG. 3 is a block diagram of distributed arbitration configuration of the subject invention.

This communication configuration serves as a distributed arbitration function with a predefined logic function 54 that determines and controls transmission of data to and from the microprocessors 34, 38, shown in FIG. 3. The active operating control microprocessor transmits and receives data while the standby microprocessor only receives data. However, once a problem is diagnosed by the standby microprocessor, such as the active operating control microprocessor failing to meet on operating specification, the standby microprocessor becomes the active operating microprocessor to ensure that the PDA operates efficiently under all operating conditions.

Figure 4:
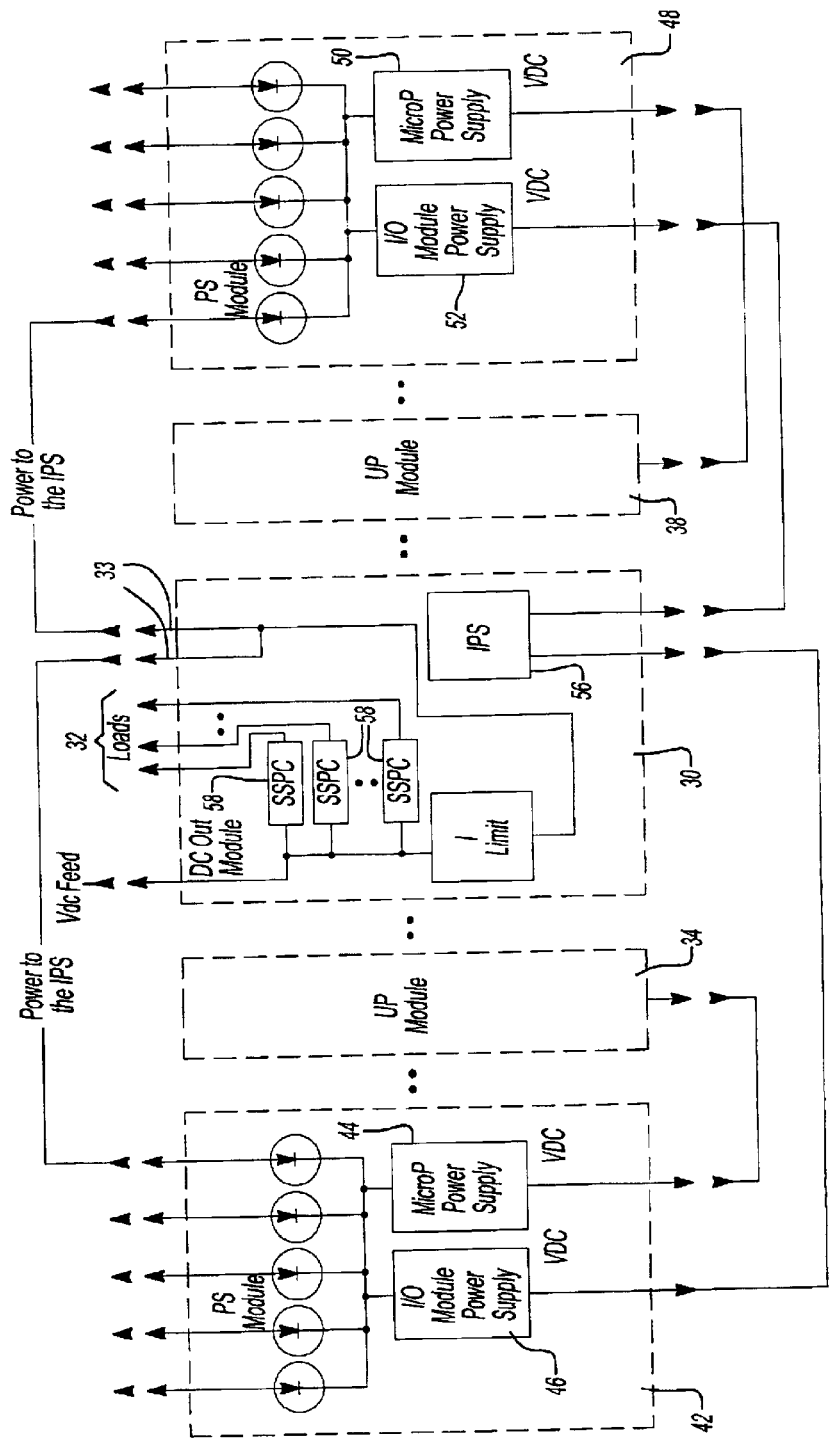
FIG. 4 is schematic diagram of the electrical architecture for the subject power distribution assembly.

A power supply block diagram for the subject invention is shown in FIG. 4. As described above, there are first 42 and second 48 power supplies that each power one microprocessor 34, 38 and redundantly power all of the other modules 30 (only one module 30 is shown in FIG. 4). The power module 30 shown in this diagram includes an internal power supply (IPS) 56 that is capable of receiving power from either of the two power supplies 42, 48 and locally regulates the voltage for use on the module. Power modules 30 in a master PDA and 68 in a satellite PDA have an additional output 33 that can be used to power the PDAs power supply module(s). Thus saving vehicle wiring.

Each power module 30 also utilizes at least one. Solid State Power Controller (SSPC) 58 to control multiple loads to provide flexibility for the output loads 32. The SSPCs 59 may have a fixed overload trip setting and/or a programmable overload trip setting. The combination of fixed and programmable SSPCs 58 is tailored to the specific application.

Figure 5:
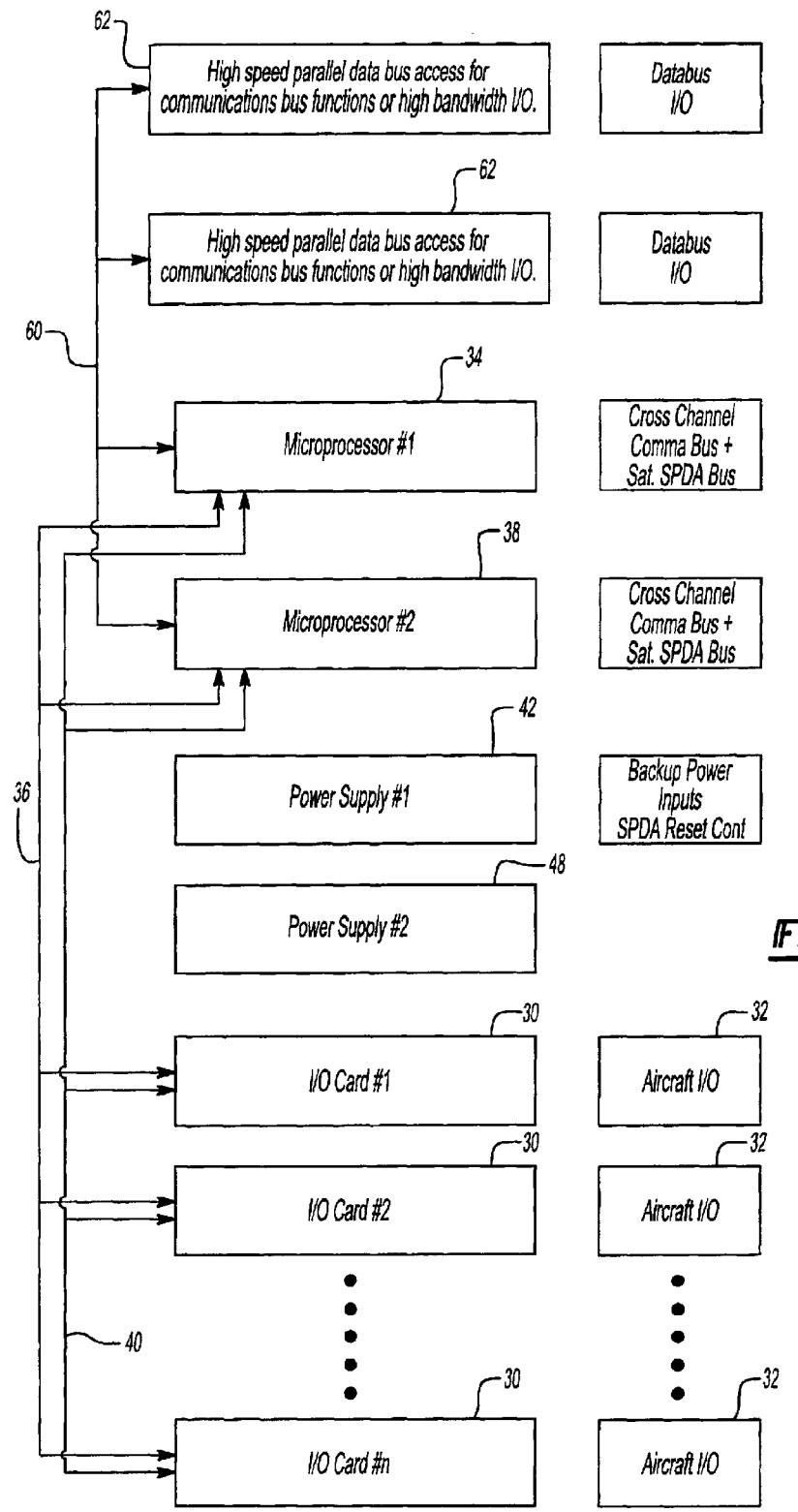
FIG. 5 is a schematic diagram of the command architecture for the subject power distribution assembly.

A communication block diagram for the subject invention is shown in FIG. 5. As described above, there are first 34 and second 38 microprocessors that are in independent communication with each of the power modules 30. The first microprocessor 34 communicates with the second microprocessor 38 and with each of the power modules 30 via the first serial bus 36. The second microprocessor 38 communicates with the first microprocessor 34 and each of the power modules 30 via the second serial bus 40.

Each of the microprocessors 34, 38 also are connected to a shared high bandwidth parallel bus 60 for communication with a vehicle data bus 62. In the event of a failure of this parallel bus 60 or of the vehicle data bus 62, the PDA can receive redundant data from another or complementary PDA in the aircraft. The combination of both microprocessors 34, 38, both power supplies 42, 48, and the power modules 30 is referred to as a master power distribution assembly, referred generally at 64 in FIG. 5.

Figure 6:
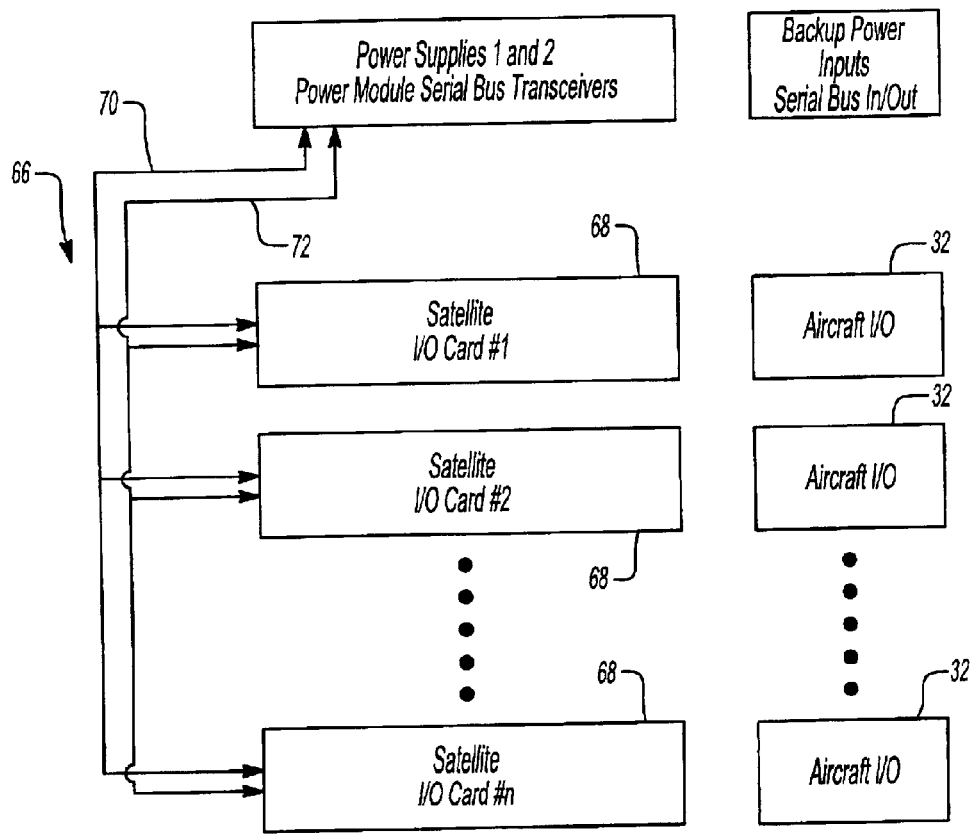
FIG. 6 is a schematic diagram of a satellite power distribution assembly incorporating the subject invention.

This electrical architecture configuration as used in a master PDA 64 also facilitates connection to satellite power distribution assemblies 66, shown generally in FIG. 6. Each satellite PDA 66 includes a power supply and a plurality of satellite power modules 68 that provide output loads 32 to different aircraft systems. Satellite power modules 68 may be identical to the power modules 30 in the master PDA 64. A first satellite serial bus 70 provides a communication path between the first serial bus 36 and each of the satellite power modules 68. A separate second satellite serial bus 72 provides a communication path between the second serial bus 40 and each of the satellite power modules 68.

Thus, the dual microprocessors 34, 38 from the master PDA 64 are used to provide command signals to satellite power modules 68 for controlling additional aircraft systems. One master PDA 64 can command multiple satellite PDAs 66. This configuration allows smaller satellite PDAs 66 to be incorporated into the aircraft, which facilitates installation and provides more flexibility.

An example of one aircraft application with multiple master 64 and satellite 66 PDAs is shown in FIG. 7. In the forward avionics area there are two (2) master PDAs 64 each of which is connected to a multifunction control display unit (MCDU) 74 and an avionics computer 76. Each master PDA 64 has two (2) satellite PDAs 66 located at remote locations in the aircraft. In the application example of FIG. 7, one satellite PDA 66 is located near the forward galley 78, another is located near the aircraft midsection 80, and another is located near the aft galley and tail section 82.

The subject invention provides a highly reliable integrated PDA system that can be easily incorporated into different aircraft and other vehicle applications. The system has a distributed architecture that prevents any single point failure from causing loss of control of more than one input/output power module 30 or 68. The system utilizes dual microprocessors 34, 38 and dual power supplies 42, 48 to provide redundancy and increased reliability. The dual microprocessors 34, 38 also provide commands to multiple satellite PDAs. Thus, the subject invention provides increased flexibility, reliability, and improves packaging options for multiple vehicle applications.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the be studied to determine the true scope and content of this

We claim:

1. A power distribution assembly comprising:
 a plurality of power modules for controlling multiple vehicle systems;
 a first microprocessor having a first serial bus in communication with each of said power modules;
 a second microprocessor having a second serial bus in communication with each of said power modules in ent from said first serial bus;
 a first power supply for powering said first microprocessor and each of said power modules; and
 a second power supply for powering said second microprocessor and each of said power modules independently from said first power supply.

2. The assembly according to claim 1 wherein said first microprocessor is in communication with said second microprocessor via said first serial bus and said second microprocessor is in communication with said first microprocessor via said second serial bus to independently determine which microprocessor is an active control microprocessor and which microprocessor is a back-up control microprocessor.

3. The assembly according to claim 2 wherein said active control microprocessor transmits and receives data while said back-up control microprocessor only receives data until a determination is made by said first and second microprocessors to change said back-up control microprocessor to said active control microprocessor.

4. The assembly according to claim 2 wherein said first microprocessor actively monitors the health of said second microprocessor via said first serial bus and said second microprocessor actively monitors the health of said first microprocessor via said second serial bus.

5. The assembly according to claim 1 wherein each of said power modules independently determines which of said first or second serial busses is in control.

6. The assembly according to claim 1 wherein said first and second microprocessors said first and second power supplies, and said power modules comprise a master power distribution assembly.

7. The assembly according to claim 6 including at least one satellite power distribution assembly located remotely form said master power distribution assembly wherein said satellite and master power distribution assemblies communicate via said first and second serial busses.

8. The assembly according to claim 7 wherein said satellite power distribution assembly includes a plurality of satellite power modules for controlling additional vehicle systems, a first satellite serial bus to provide communication between said first serial bus and each of said satellite power modules, and a second satellite serial bus to provide communication between said second serial bus and each of said satellite power modules independently from said first satellite serial bus.

9. The assembly according to claim 8 wherein said first and second microprocessors provide command data for each of said satellite power modules.

10. The assembly according to claim 1 wherein said first and second microprocessors communicate with a vehicle data bus via a common high bandwidth parallel bus.

11. A method of distributing power to a plurality of power modules in a power distribution assembly to control multiple aircraft systems comprising the steps of:
 (a) connecting a first serial bus between a first microprocessor and each of the power modules;
 (b) connecting a separate second serial bus between a second microprocessor and each of the power modules;
 (c) powering each of the power modules and the first microprocessor with a first power supply; and
 (d) independently powering each of the power modules and the second microprocessor with a second power supply.

12. The method according to claim 11 including the steps of the first microprocessor communicating with the second microprocessor via the first serial bus and the second microprocessor communicating with the first microprocessor via the second serial bus to determine which microprocessor is the active control microprocessor and which microprocessor is the back-up control microprocessor.

13. The method according to claim 12 including the steps of transmitting data and receiving data from the active control microprocessor and only transmitting data to the back-up control microprocessor.

14. The method according to claim 13 including the step of generating command data only from the active control microprocessor.

15. The method according to claim 14 including the steps of the first microprocessor actively monitoring the health of the second microprocessor via the first serial bus, the second microprocessor actively monitoring the health of the first microprocessor via the second serial bus, comparing the health of the active control microprocessor to a predetermined diagnostic and changing the back-up control microprocessor to active control microprocessor if the predetermined diagnostic is not satisfied.

16. The method according to claim 11 including the step of each power module independently determining which of the first or second serial busses is in control.

17. The method according to claim 11 further including the steps of defining the first and second power supplies, the first and second microprocessors, and the power modules as a master power distribution assembly and distributing power from the master distribution power assembly to at least one satellite power distribution assembly.

18. The method according to claim 17 including the steps of providing a plurality of satellite power modules in the satellite power distribution assembly for controlling additional aircraft systems and controlling each power module with commands only from the first or second microprocessor via the first or second serial busses, respectively.

19. The method according to claim 18 including the steps of powering each of the satellite power modules with either the first or second power supply.

* * * * *

UNITED STATES PATENT AND TRADEMARK OFFICE
CERTIFICATE OF CORRECTION

PATENT NO. : 6,856,045 B1
DATED : February 15, 2005
INVENTOR(S) : Beneditz et al.

It is certified that error appears in the above-identified patent and that said Letters Patent is hereby corrected as shown below:

Column 5,
Line 42, "in ent" should be -- independent --.

Column 6,
Line 10, "form" should be -- from --.

Signed and Sealed this

Tenth Day of May, 2005

JON W. DUDAS
*Director of the United States Patent and Trademark Office*